United States Patent
Cass et al.

(10) Patent No.: US 12,384,528 B2
(45) Date of Patent: Aug. 12, 2025

(54) IONIC PROPULSION SYSTEM

(71) Applicants: William J. Cass, Southwick, MA (US); Gregory H. Kurfess, Atlanta, GA (US)

(72) Inventors: William J. Cass, Southwick, MA (US); Gregory H. Kurfess, Atlanta, GA (US)

(73) Assignees: William J. Cass, Southwick, MA (US); Gregory H. Kurfess, Atlanta, GA (US)

( * ) Notice: Subject to any disclaimer, the term of this patent is extended or adjusted under 35 U.S.C. 154(b) by 933 days.

(21) Appl. No.: 17/361,626

(22) Filed: Jun. 29, 2021

(65) Prior Publication Data
US 2022/0063821 A1    Mar. 3, 2022

Related U.S. Application Data

(60) Provisional application No. 63/070,870, filed on Aug. 27, 2020.

(51) Int. Cl.
*B64C 23/00* (2006.01)
*B64C 23/06* (2006.01)
*B64C 23/08* (2006.01)

(52) U.S. Cl.
CPC .......... *B64C 23/005* (2013.01); *B64C 23/069* (2017.05); *B64C 23/08* (2013.01)

(58) Field of Classification Search
CPC ..... B64C 23/08; B64C 23/005; B64C 23/069; F03H 1/0081
See application file for complete search history.

(56) References Cited

U.S. PATENT DOCUMENTS

| | | | | |
|---|---|---|---|---|
| 5,437,421 A | * | 8/1995 | Nosenchuck | F28F 13/02 244/130 |
| 6,570,333 B1 | * | 5/2003 | Miller | B64C 23/005 315/111.21 |

(Continued)

FOREIGN PATENT DOCUMENTS

| | | | | |
|---|---|---|---|---|
| EP | 1619118 A2 | * | 1/2006 | B64C 23/005 |
| EP | 1928216 A1 | * | 6/2008 | B64C 23/005 |

(Continued)

OTHER PUBLICATIONS

Hosangadi, Pranav et al., "Improved Stall Prediction for Swept Wings Using Low-Order Aerodynamics," 33rd AIAA Applied Aerodynamics Conference, Jun. 2015. 18 pages.

(Continued)

*Primary Examiner* — Joshua J Michener
*Assistant Examiner* — Aaron M Rodziwicz
(74) *Attorney, Agent, or Firm* — McCarter & English, LLP; Dave S. Christensen

(57) ABSTRACT

An ionic propulsion system for an aircraft having an airfoil includes a first conductor and a second conductor, the first conductor and the second conductor being disposed at least partially within the airfoil when not in use. The propulsion system includes an actuator for extending the first conductor and the second conductor from an end of the airfoil such that the first conductor and the second conductor are in the airstream of the aircraft, the first conductor being upstream of the second conductor in the airstream. The propulsion system includes a power supply for supplying current to the first conductor and the second conductor to ionize the air particles in the vicinity of the first conductor and the end of the airfoil to create a flow of the ionized particles from the first conductor toward the second conductor.

6 Claims, 16 Drawing Sheets

(56) References Cited

U.S. PATENT DOCUMENTS

| | | | |
|---|---|---|---|
| 7,380,756 B1* | 6/2008 | Enloe | H05H 1/2439 |
| | | | 244/175 |
| 7,413,149 B2 | 8/2008 | Minick et al. | |
| 7,744,039 B2 | 6/2010 | Miles et al. | |
| 8,304,947 B2* | 11/2012 | Miller | F16C 32/0448 |
| | | | 310/90.5 |
| 8,727,286 B2 | 5/2014 | Silkey et al. | |
| 9,346,559 B1 | 5/2016 | Skelton | |
| 10,119,527 B2 | 11/2018 | Krauss | |
| 11,415,118 B1* | 8/2022 | Colasante | B64G 1/405 |
| 2006/0131282 A1* | 6/2006 | Miller | H05H 1/54 |
| | | | 219/121.5 |
| 2008/0023589 A1* | 1/2008 | Miles | B64D 15/12 |
| | | | 244/205 |
| 2008/0116808 A1* | 5/2008 | McClure | F15D 1/12 |
| | | | 315/111.61 |
| 2008/0122252 A1* | 5/2008 | Corke | H05H 1/2439 |
| | | | 296/180.1 |
| 2009/0038408 A1* | 2/2009 | Lu | B64C 21/00 |
| | | | 73/861.14 |
| 2009/0127401 A1* | 5/2009 | Cousins | B64C 23/005 |
| | | | 323/318 |
| 2009/0159754 A1* | 6/2009 | Minick | B64C 11/18 |
| | | | 416/223 R |
| 2010/0127624 A1* | 5/2010 | Roy | H05H 1/2406 |
| | | | 315/111.21 |
| 2010/0224733 A1* | 9/2010 | Wood | F15D 1/12 |
| | | | 244/205 |
| 2011/0198312 A1* | 8/2011 | Tanaka | H05H 1/2441 |
| | | | 216/13 |
| 2011/0272531 A1* | 11/2011 | Minick | B64C 23/005 |
| | | | 60/202 |
| 2012/0291874 A1* | 11/2012 | Tanaka | F01D 5/145 |
| | | | 137/833 |
| 2014/0090358 A1* | 4/2014 | Zonenberg | F02K 99/00 |
| | | | 60/200.1 |
| 2015/0232172 A1* | 8/2015 | Morris | B64C 21/00 |
| | | | 244/205 |
| 2015/0284072 A1* | 10/2015 | Minick | B64C 23/005 |
| | | | 244/205 |
| 2016/0007436 A1* | 1/2016 | Roy | F15D 1/0075 |
| | | | 315/111.41 |
| 2017/0129592 A1* | 5/2017 | Clemen, Jr. | B64C 23/005 |
| 2017/0292499 A1* | 10/2017 | Sia | F03D 9/25 |
| 2017/0370387 A1* | 12/2017 | Nino | F15D 1/0075 |
| 2018/0149178 A1* | 5/2018 | Caspari | F15D 1/0075 |
| 2018/0170517 A1* | 6/2018 | Ratti | B64U 30/26 |
| 2018/0297698 A1* | 10/2018 | Dhall | B60F 5/02 |
| 2019/0127051 A1* | 5/2019 | Miyawaki | G01N 29/245 |
| 2019/0145443 A1* | 5/2019 | Smullin | G01P 13/045 |
| | | | 137/805 |
| 2019/0193842 A1* | 6/2019 | Kato | F01D 11/20 |
| 2019/0193843 A1* | 6/2019 | Kikuchi | B64C 9/18 |
| 2019/0300159 A1* | 10/2019 | Kikuchi | B64C 9/00 |
| 2019/0322358 A1* | 10/2019 | Kato | B64C 23/005 |
| 2019/0329870 A1* | 10/2019 | Kato | B64C 23/06 |
| 2019/0344878 A1* | 11/2019 | Kato | B64C 13/50 |
| 2020/0361597 A1* | 11/2020 | Llamas Sandin | B64C 23/005 |
| 2020/0386213 A1* | 12/2020 | Barrett | B64C 23/005 |
| 2021/0129978 A1* | 5/2021 | Kato | B64C 23/005 |
| 2021/0143722 A1* | 5/2021 | Ieta | B63H 7/02 |
| 2021/0147088 A1* | 5/2021 | Rathay | B64C 1/38 |
| 2022/0003222 A1* | 1/2022 | Frazier | B64C 23/005 |

FOREIGN PATENT DOCUMENTS

| | | | | |
|---|---|---|---|---|
| EP | 2505782 A1 * | 10/2012 | | B64C 23/005 |
| WO | WO-2008136697 A1 * | 11/2008 | | B64C 23/005 |
| WO | WO-2008136698 A1 * | 11/2008 | | B64C 23/005 |
| WO | WO-2012081704 A1 * | 6/2012 | | B64C 23/005 |
| WO | WO-2014084925 A1 * | 6/2014 | | B64C 23/005 |
| WO | WO-2014131055 A1 * | 8/2014 | | B64C 23/005 |
| WO | WO-2017218801 A1 * | 12/2017 | | B64C 30/00 |
| WO | WO-2019226712 A9 * | 3/2020 | | B63H 7/02 |
| WO | WO-2020247031 A1 * | 12/2020 | | B64C 23/005 |
| WO | WO-2022256488 A1 * | 12/2022 | | |

OTHER PUBLICATIONS

Rethmel, Christopher, "Airfoil Leading Edge Flow Separation Control Using Nanosecond Pulse DBD Plasma Actuators," Thesis Presented in Partial Fulfillment of the Requirements for the Degree Master of Science in the Graduate School of The Ohio State University, The Ohio State University 2011. 80 pages.

Likhanskii, A.V. et al., "Modeling of Interaction Between Weakly Ionized Near Surface Plasmas and Gas Flow," presented at the 44th AIAA Aerospace Sciences Meeting and Exhibit, Jan. 9-12, 2006. 26 pages.

Al-Garni, Ahmed Z., "Flow Control for an Airfoil with Leading-Edge Rotation: An Experimental Study," Journal of Aircraft vol. 37, No. 4, Jul.-Aug. 2000. 7 pages.

Chu, Jennifer, "MIT engineers fly first-ever plane with no moving parts," MIT News, Nov. 21, 2018. Retrieved from the Internet at http://news.mit.edu/2018/first-ionic-wind-plane-no-moving-parts-1121. Retrieved on Jun. 28, 2021. 9 pages.

* cited by examiner

IONIC PROPULSION SYSTEM

CROSS-REFERENCE TO RELATED APPLICATIONS

The present application claims the benefit of U.S. Provisional Patent Application No. 63/070,870, filed Aug. 27, 2020, the contents of which are incorporated by reference herein.

BACKGROUND OF THE INVENTION

It is well understood that the construction of an aircraft wing has a significant impact on the aerodynamic characteristics of the wing, particularly with respect to lift production and boundary separation.

The swept back wing offers many benefits. In general, tapering causes a decrease in drag (most effective at high speeds) and an increase in lift. There is also a structural benefit due to a saving in weight of the wing. Airplanes that are developed to operate at very high speeds demand greater aerodynamic cleanness and greater strength, which require low aspect ratios. Very low aspect ratios result in high wing loadings and high stall speeds. When sweepback is combined with low aspect ratio, it results in flying qualities very different from a more conventional high aspect ratio airplane configuration. See *Pilot's Handbook of Aeronautical Knowledge*, Ch. 5, FAA-H-8083-25B, Federal Aviation Administration, 2016.

Boundary separation, i.e., the separation of smooth airflow adherence to the wing, begins at the wing tip in the swept back wing, causing an increased loss in control surface effectiveness.

Many attempts to understand these phenomena have occurred. For example, low-order aerodynamic prediction methods, such as the vortex lattice method, have been used to predict the force and moment characteristics of arbitrary wing geometries, including swept back wings, for pre-stall conditions. The use of modified lift curves (decambered) for the sections of swept wings, with modifications derived from analysis of RANS (Reynolds Averaged Navier Stokes) based Computational Fluid Dynamics (CFD), have been employed. For swept wing geometries, however, spanwise pressure gradients cause tipward transport of separated flow, which causes modified stall characteristics across the span. In the swept back wing, the flow remains attached up to higher angles of attack in the inboard regions and separates at lower angles of attack in the outboard regions, causing poor prediction of stall characteristics. See *Improved Stall Prediction for Swept Wings Using Low-Order Aerodynamics*, Hosangadi, Pranav; Paul, Ryan; and Gopalarathnam, Ashok. Jun. 22, 2015, 10.2514/6.2015-3159.

Attempts at reducing airflow separation from an airfoil using electrical impulse have been researched. For example, experiments using dielectric barrier discharge (DBD) plasma actuators driven by repetitive nanosecond pulses for high Reynolds number aerodynamic flow control have been undertaken. Leading edge separation control on an 8-inch chord NACA 0015 airfoil was demonstrated at various post-stall angles of attack ($\alpha$) for Reynolds numbers (Re) and Mach numbers (M) up to $1.15 \times 106$ and 0.26, respectively (free stream velocity, $U\infty=93$ m/s). At post-stall $\alpha$, the device generated coherent spanwise vortices that transfer momentum from the freestream to the separated region, thus reattaching the flow. See *Airfoil Leading Edge Flow Separation Control Using Nanosecond Pulse DBD Plasma Actuators*, Presented in Partial Fulfillment of the Requirements for the Degree Master of Science in the Graduate School of The Ohio State University, Christopher C. Rethmel, Graduate Program in Mechanical Engineering, The Ohio State University 2011.

U.S. Pat. No. 7,380,756 to Enloe et al. ("the '756 Patent"), teaches an improved aerodynamic airfoil that provides a dielectric barrier discharge apparatus. For example, the '756 Patent discloses an apparatus having an ionized gas plasma generated by a dielectric barrier aerodynamic plasma actuator mechanism for improved boundary layer adhesion. The apparatus includes an exposed dielectric barrier discharge first electrode member located in a first location of an airflow stream across an aerodynamic airfoil element of an aircraft; a dielectric barrier-surrounded and enclosed second electrode member located in an adjacent but displaced second downstream location of the aircraft, an aerodynamic airfoil element with respect to the first electrode member; and a source of plasma generation-efficient waveform alternating current electrical energy of kilovolt peak electrical potential connected between the first and second airfoil electrode members; the dielectric barrier discharge first electrode member and the dielectric barrier surrounded second electrode member being disposed adjacent a point of airflow separation of the airfoil.

U.S. Pat. No. 7,413,149 to Minick et al., discloses a system for augmenting the apparent velocity and effectiveness of an airfoil, such as a wing, on a vehicle includes at least one ionizer or emitter positioned relative to the airfoil to ionize a fluid media in which the airfoil travels and at least one attractor/receiver for accelerating the flow of ionized fluid media over the airfoil. The system further includes a voltage source to which each ionizer and each attractor is electrically connected. U.S. Pat. No. 7,744,039 to Miles et al. ("the '039 Patent"), discloses an aircraft system having aerodynamic body having a flow surface exposed to an adjacent airstream, and a flow control assembly that includes a first electrode positioned at least proximate to the flow surface and a second electrode positioned proximate to and spaced apart from the first electrode. A dielectric material is positioned between the first and second electrodes, and a controller is coupled to at least one of the electrodes, with the controller programmed with instructions to direct air-ionizing pulses to the electrode and provide a generally steady-state signal to the electrode during intervals between the pulses. The system may be situated upstream of an air induction engine.

Further, as disclosed in the '039 Patent, localized flow acceleration is expected by the computations described in greater detail in AIAA Publication 2006-1204 by Likhanskii et al., entitled *Modeling of Interaction Between Weakly Ionized Near Surface Plasmas and Gas Flow*, presented at the $44^{th}$ AIAA Aerospace Sciences Meeting and Exhibit, Jan. 9-12, 2006 ("the Likhanskii Reference").

Attempts with using airflow control with rotating cylinders have included an experimental investigation conducted on a two-dimensional NACA 0024 airfoil equipped with a leading-edge rotating cylinder. See *Flow Control for an Airfoil with Leading-Edge Rotation: An Experimental Study*, JOURNAL OF AIRCRAFT Vol. 37, No. 4, July-August 2000.

More recently, scientists from the Massachusetts Institute of Technology have developed a model aircraft that is completely based on ionic propulsion. See http://news.mit.edu/2018/first-ionic-wind-plane-no-moving-parts-1121. See also U.S. Pat. No. 10,119,527 to Krauss. This propulsion system is impractical for large aircraft as presently constructed.

While these efforts attempt to improve boundary separation and/or propulsion with the application of ionic propulsion, what is needed is a practical ionic propulsion system for an airfoil that can be deployed from the aircraft wing when desired to improve boundary layer adherence at the wing tips by local acceleration of the air stream.

BRIEF SUMMARY OF THE INVENTION

An ionic propulsion system for an aircraft having an airfoil includes a first conductor and a second conductor, the first conductor and the second conductor being disposed at least partially within the airfoil when not in use. The propulsion system includes an actuator for extending the first conductor and the second conductor from an end of the airfoil such that the first conductor and the second conductor are in the airstream of the aircraft, the first conductor being upstream of the second conductor in the airstream. The propulsion system includes a power supply for supplying current to the first conductor and the second conductor to ionize the air particles in the vicinity of the first conductor and the end of the airfoil to create a flow of the ionized particles from the first conductor toward the second conductor.

Alternatively, the propulsion system includes a first conductor rotatably mounted in relationship to the airfoil. The first conductor is coupled to the power supply with a slip ring bearing assembly.

Alternatively, the propulsion system may include a first electrode formed as an airfoil and a second electrode formed as an airfoil.

Alternatively, the propulsion system may include a motor for control of the rotation of the first conductor.

BRIEF DESCRIPTION OF THE DRAWINGS

Referring to the drawings, wherein like elements are numbered alike in the several FIGURES.

DETAILED DESCRIPTION OF THE INVENTION

Figure 1:
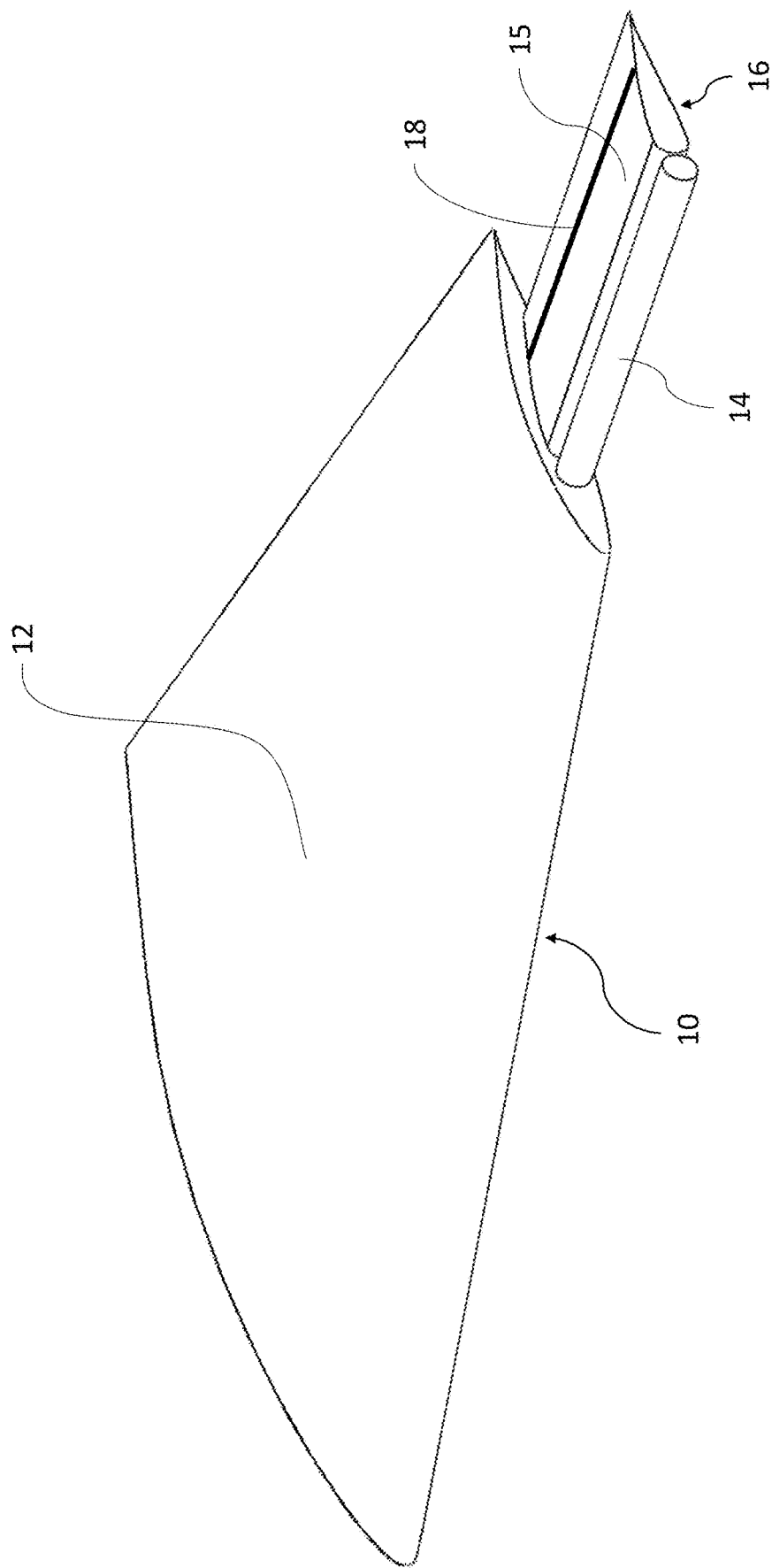
FIG. 1 shows a perspective view of an airfoil with the ionic propulsion system of the present invention in the extended position.

Referring to FIG. 1, an ionic propulsion system 10 of the present invention for an airfoil 12 is generally illustrated in a perspective view. Ionic propulsion system 10 includes a first conductor 14 moveably mounted within the airfoil 12 and a second airfoil 16 having a second conductor 18 associated therewith. A dielectric material 15 is positioned between first conductor 14 and second conductor 18. Second airfoil 16 is moveably mounted within airfoil 12.

Figure 2:
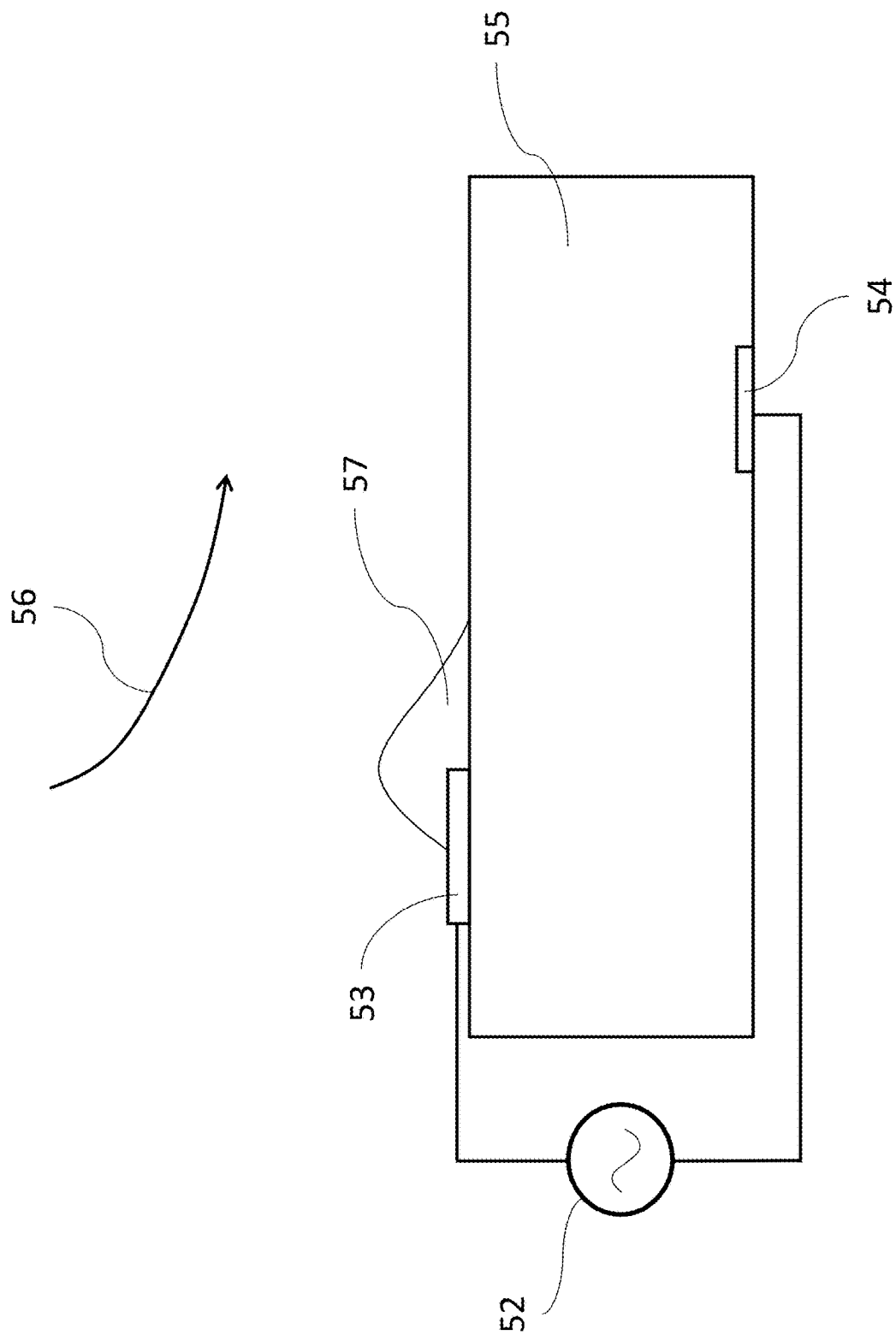
FIG. 2 illustrates an asymmetric dielectric barrier discharge configuration of the prior art.

As shown in FIG. 2, and as disclosed in the aforementioned Likhanskii Reference which is incorporated herein by reference, by way of illustration and not by limitation, an asymmetric dielectric barrier discharge (DBD) of the prior art is generally illustrated. See also the '039 Patent. In FIG. 2, an alternating current 52 is applied to an exposed electrode 53 and an insulated electrode 54 separated by a dielectric material 55 to induce flow 56 from the exposed electrode 53 to the insulated electrode 54. Gas plasma 57 is created near the right edge of the exposed electrode 53.

Figure 3:
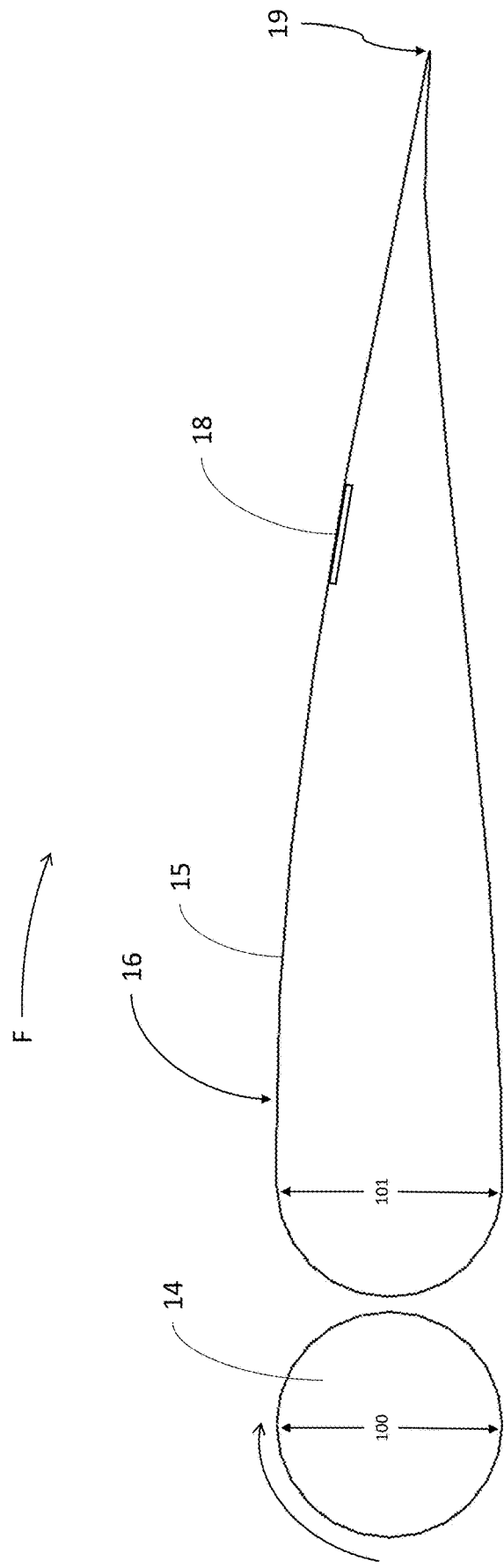
FIG. 3 shows a side view of an ionic propulsion system of the present invention.

Referring to FIG. 3, a side view of ionic propulsion system 10 of FIG. 1 is shown. First conductor 14 may be rotatably mounted adjacent to second airfoil 16. Second conductor 18 is associated with second airfoil 16 and is positioned more aft to the trailing edge 19 of second airfoil 16 in proximity to first conductor 14 to effectuate the acceleration of an ionic field.

First conductor 14 comprises a conductive material, such as stainless steel, and may be coated with an environmental conductive coating such as a thin layer of tungsten, tungsten carbide (or another tungsten alloy), nichrome or stainless steel. Additional treatments may include a silicon or gallium arsenide bulk material treated with a suitable dopant (e.g., boron or phosphorus, in the case of silicon) as is known in the art. See, for example, the '039 Patent at Col. 6, lines 5-50. The protective coating provides resistance to environmental conditions, including resistance to rain erosion, oxidation, and exposed fuel and/or ice protection materials. The environmental conductive coating is provided uniformly around the circumference of first conductor 14 such that interference with the ionizing field is minimized as first conductor 14 rotates when rotatably mounted. Second conductor 18 may be insulated to prevent arcing between first and second conductors 14, 18.

For improved aerodynamic flow F, first conductor 14 comprises a diameter 100 sized to height 101 of second airfoil 16 and is placed in close proximity to the leading edge of second airfoil 16. For example, wind tunnel analysis (virtual) established turbulence was reduced for NACA 15 and NACA 6 series models in such a configuration at 250 knots under standard atmospheric conditions.

Figure 4:
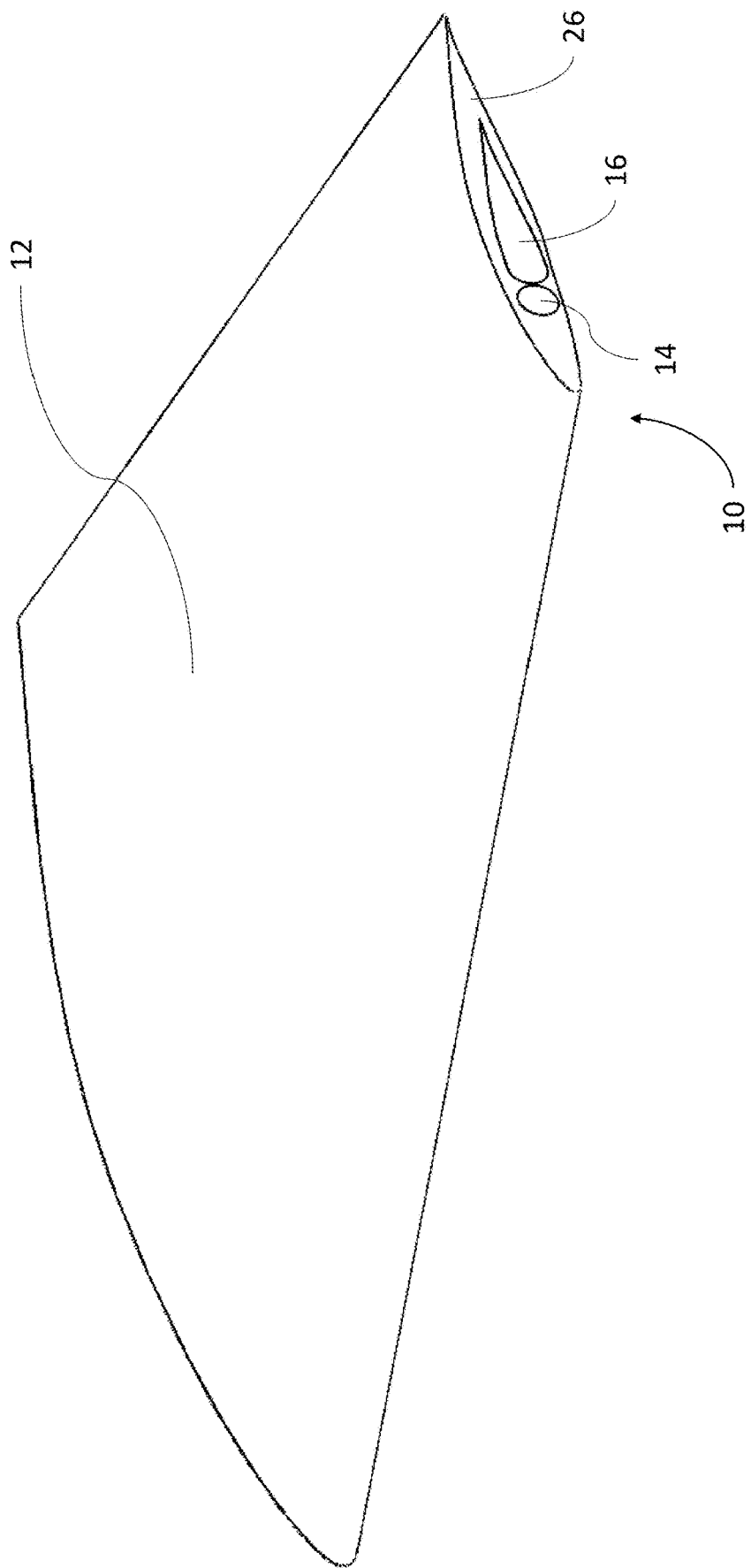
FIG. 4 shows a perspective view of an airfoil with the ionic propulsion system of the present invention in the retracted position.
Figure 5:
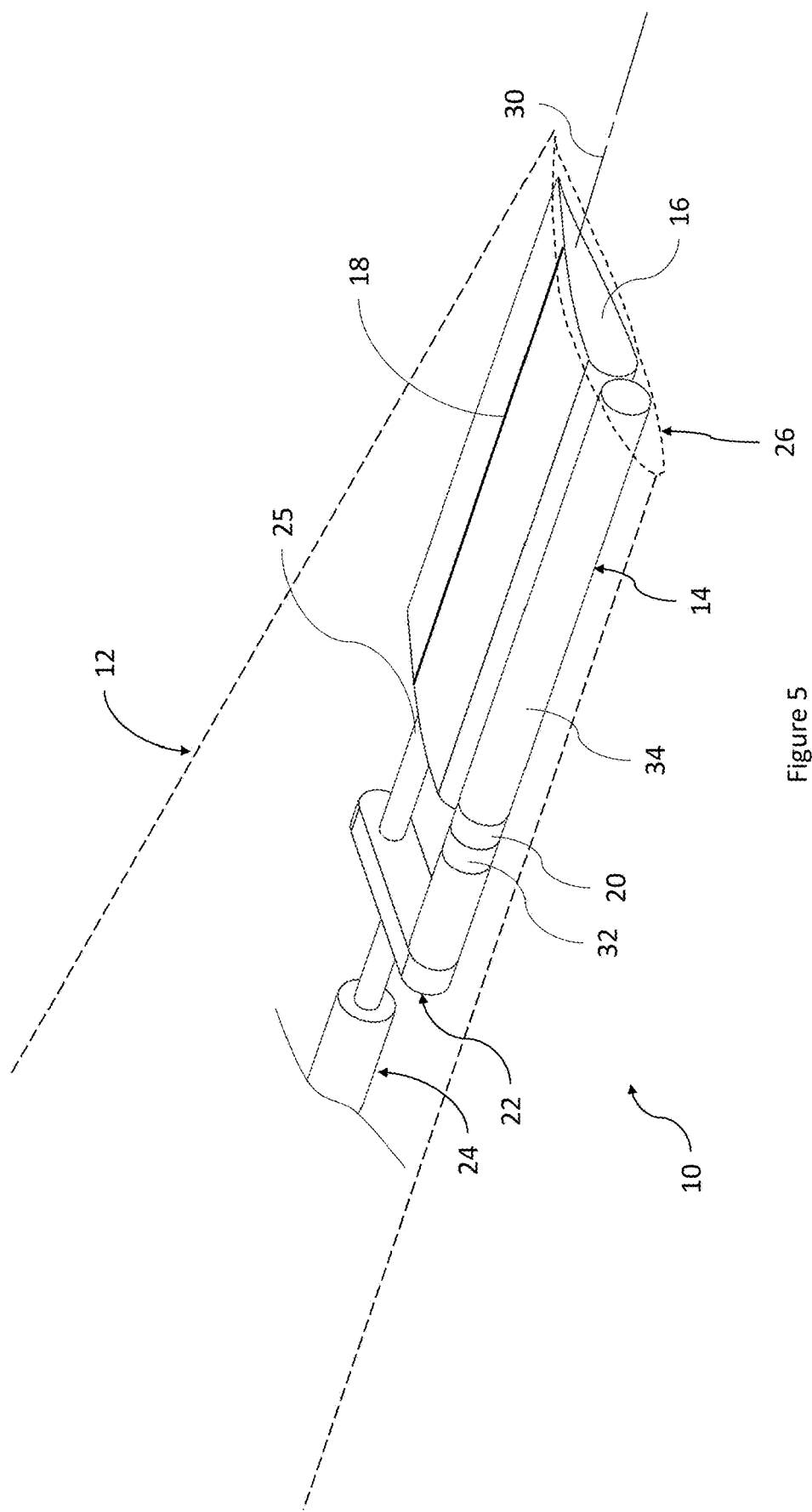
FIG. 5 shows an interior view of an airfoil with an embodiment of the ionic propulsion system in the retracted position.

As shown in FIG. 4 and FIG. 5, ionic propulsion system 10 is movable from a first (retracted) position in which first conductor 14 and second conductor 18 are contained within airfoil 12 to a second (extended) position (e.g., FIG. 1) in which first conductor 14 and second conductor 18 are positioned outside airfoil 12 and extend from end 26 of airfoil 12. It will be appreciated by those skilled in the art that ionic propulsion system 10 could be of modular construction for attachment to a wing. Additionally, ionic propulsion system 10 may be constructed in a winglet and/or attached to a winglet.

In operation, at low airspeeds when heavy lift devices such as flaps and slats are deployed, ionic propulsion system 10 may be at least partially positioned in airfoil 12 when not in use.

As shown in FIG. 5, ionic propulsion system 10 is moveably mounted within airfoil 12. Ionic propulsion system 10 is axially extended along a longitudinal axis 30 of airfoil 12. First conductor 14 and second conductor 18 are moveable from a first position within airfoil 12 and are attached to carriage element 22. Carriage element 22 is moved axially along the longitudinal axis 30 by actuator 24 to extend first conductor 14 and second conductor 18 from their protracted position to protrude from end 26 of airfoil 12. Actuator 24 comprises an electrically actuated hydraulic cylinder. Optionally, actuator 24 may be constructed as a pneumatic cylinder, an electro servo device with a screw type rod, and/or a hydraulic cylinder or similar devices generally known in the art.

First conductor 14 is attached to carriage element 22 by insulator 20. Second conductor 18 is attached to carriage element 22 by insulator 25. Insulator 25 may be optionally contained within second airfoil 16 which is moveable along axis 30. Second airfoil 16 is attached to carriage element 22.

First conductor 14 may optionally have a rotatable portion 34 to reduce aerodynamic drag and take advantage the Magnus effect of a rotating cylinder in the airstream. First conductor 14 includes a slip ring bearing assembly 32 or other rotational electrical connector for supplying electrical current to rotatable portion 34. Insulator 20 is directly coupled to carriage element 22 when first conductor 14 does not include rotatable portion 34. Alternatively, an electric motor in place of slip ring bearing assembly 32 may impart rotation to first conductor 14.

First conductor 14 comprises a Dielectric Barrier Discharge (DBD) plasma actuator to create a localized filament AC waveform (AC-DBD). The discharge is driven by repetitive nanosecond duration pulses (NS-DBD). DBD plasma is created using these waveforms. First conductor 14 acts a positively charged electrode, charging the ion particles in the vicinity of first conductor or electrode 14. Second conductor or electrode 18 is negatively charged. The ion particles in the vicinity of first conductor or electrode 14 are thus positively charged and attracted to the negatively charged second conductor or electrode 18. Surface adhesion, i.e., boundary separation in the vicinity of end 26 of airfoil 12 is thereby benefited.

Figure 6:
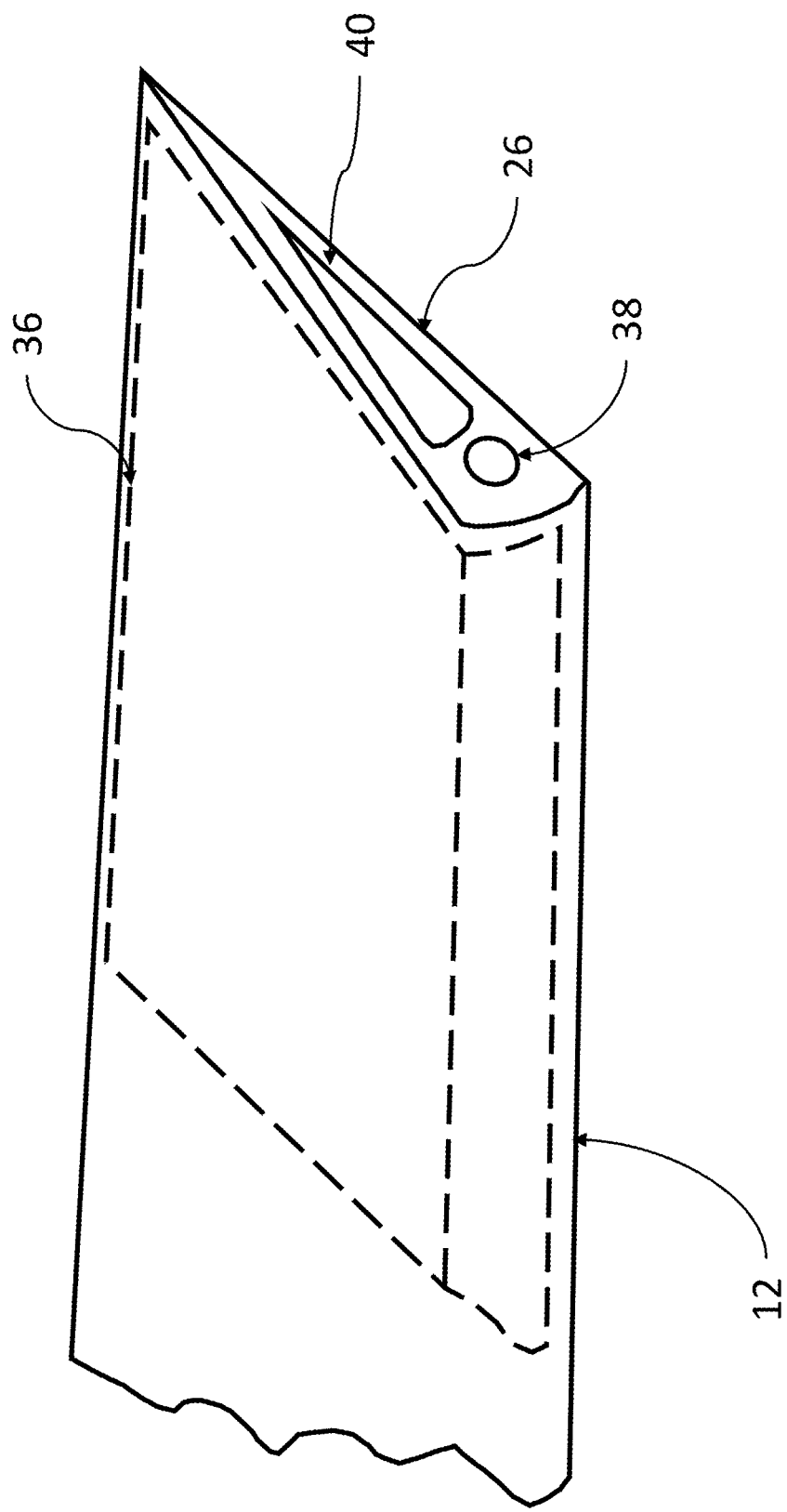
FIG. 6 shows an interior view of an airfoil having an interior chamber to receive the ionic propulsion system of the present invention.

As shown in FIG. 6, airfoil 12 has an interior chamber 36 to moveably receive ionic propulsion system 10. End 26 of airfoil 12 has an opening 38 to receive first conductor 14 and an opening 40 to receive second airfoil 16 containing second conductor 18.

Figure 7:
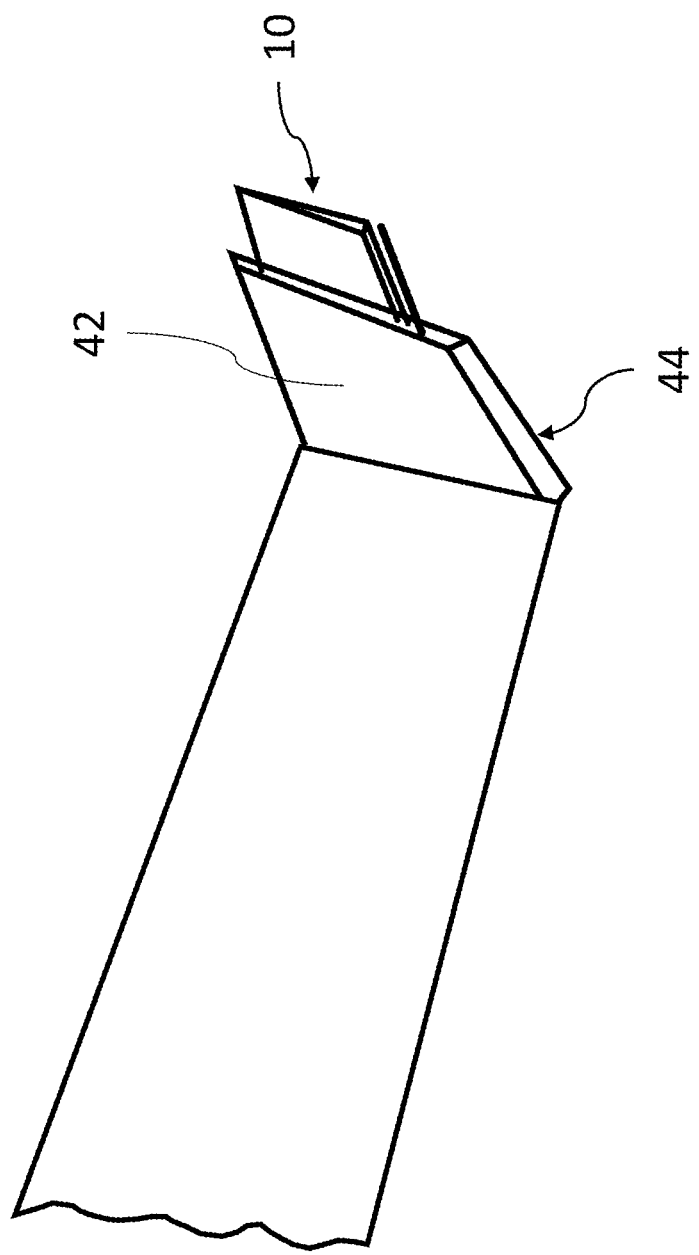
FIG. 7 shows a perspective view of another embodiment of the ionic propulsion system in a winglet of an airfoil.

As shown in FIG. 7, ionic propulsion system 10 may be positioned in an airfoil 42 of a winglet 44. Winglet 44 may be of modular construction for attachment to an aircraft wing.

Figure 8:
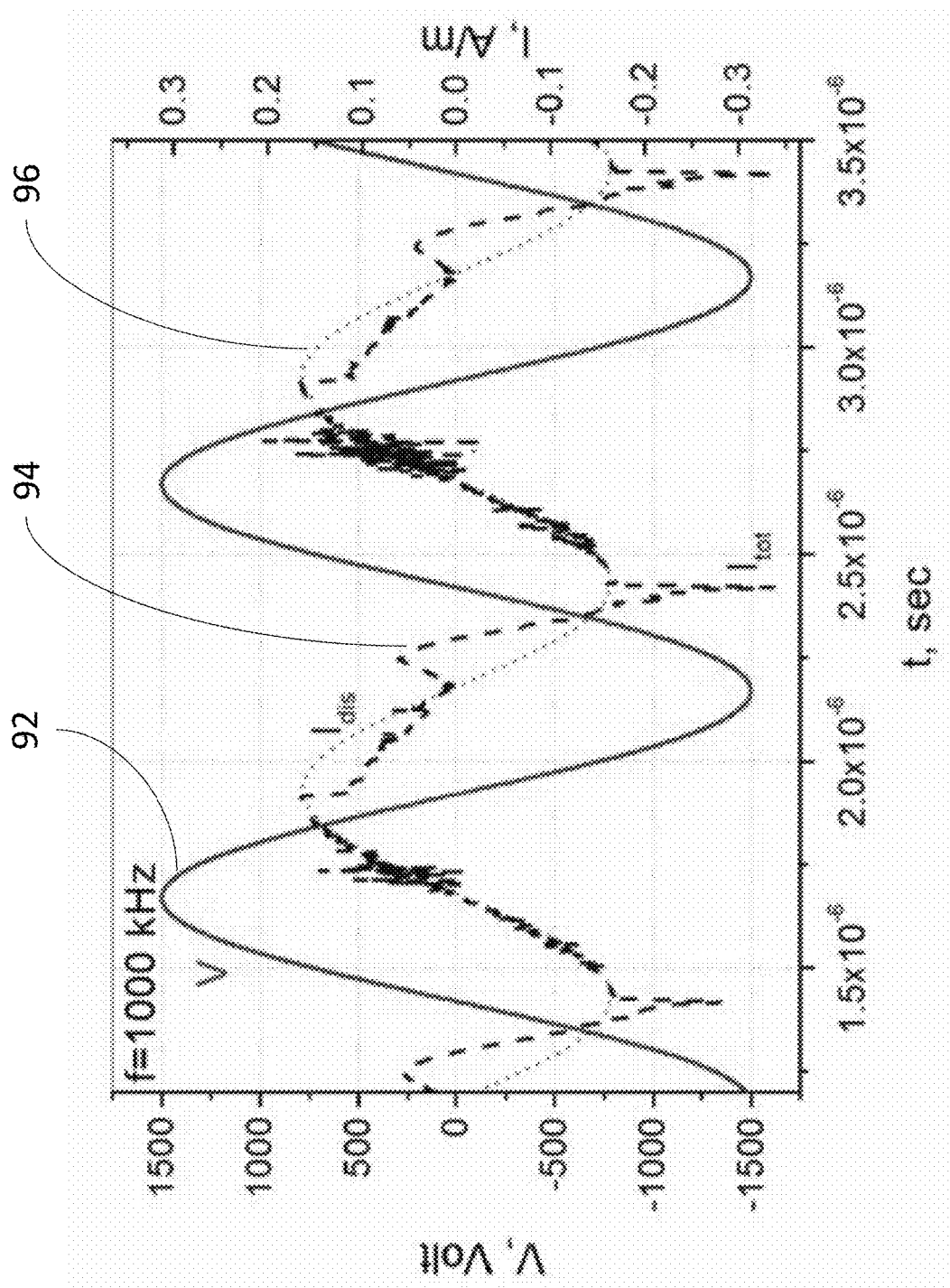
FIG. 8 shows the voltage and current waveforms of an asymmetric dielectric barrier discharge configuration of the prior art.

FIG. 8 shows the applied voltage and calculated total and displacement currents in a representative case with an applied 1.5 kV, 1000 kHZ sinusoidal voltage. See FIG. 2 of the Likhanskii Reference. In FIG. 8, the applied voltage (V, Volt) is plotted over time (t, sec) in a solid line waveform 92. The dashed line waveform 94 represents the calculated total current, and the dotted line waveform 96 represents the displacement current. As disclosed in the '039 Patent, higher voltage pulses increase efficiency of the ionization process with which the boundary layer air is accelerated. See Col. 9, ln 55-Col. 11, 23, of the '039 Patent for example.

Figure 9:
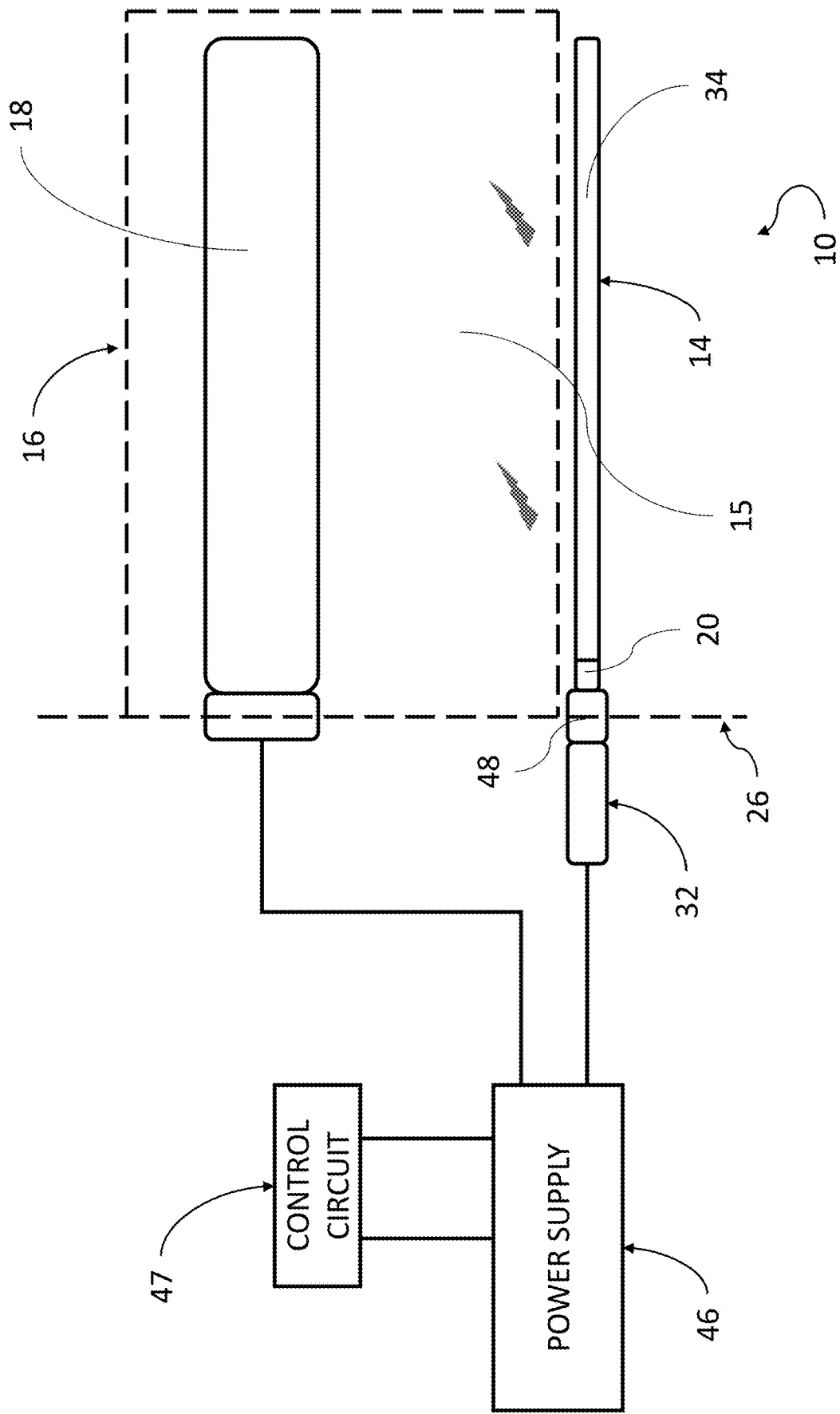
FIG. 9 shows a diagram of a power supply and control circuit for the ionic propulsion system of the present invention.

As shown in FIG. 9, ionic propulsion system 10 includes an electrical power supply 46 and control circuit 47 to supply alternating current to first conductor 14 and second conductor 18. Electrical power supply 46 is a Dielectric Barrier Discharge (DBD) plasma actuator to create a localized filament AC waveform (AC-DBD). The discharge is driven by repetitive nanosecond duration pulses (NS-DBD). DBD plasma is created using these waveforms. First conductor 14 acts a positively charged electrode, charging the ion particles in the vicinity of first conductor or electrode 14. Second conductor 18 acts as a negatively charged electrode. The ion particles in the vicinity of first conductor or electrode 14 are thus positively charged and attracted to the negatively charged second conductor or electrode 18. Dielectric material 15 is positioned between the two conductors or electrodes 14, 18. Surface adhesion, i.e., boundary separation in the vicinity of end 26 of airfoil 12 is thereby reduced. Power supply 46 may be connected to the electrical service from an aircraft engine.

Figure 10:
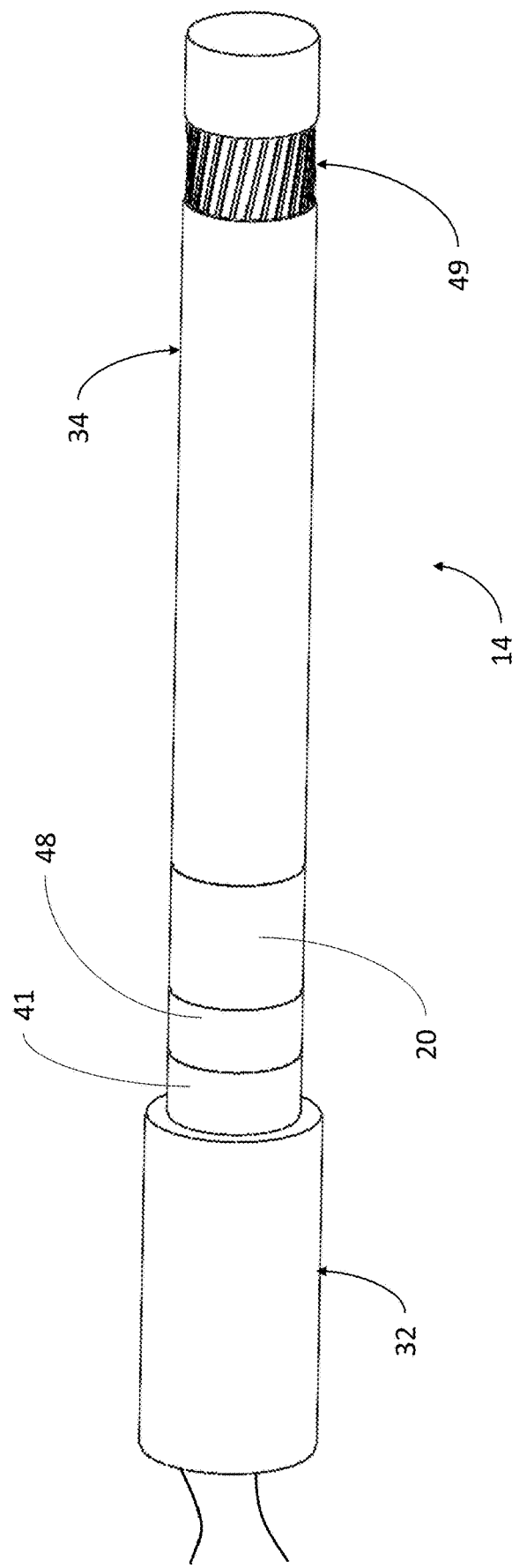
FIG. 10 shows an alternative embodiment of the ionic propulsion system of the present invention.

As shown in FIG. 10, an alternative embodiment of ionic propulsion system 10 is shown. First conductor 14 comprises rotatable portion 34 mounted via slip ring bearing assembly 32 to a shaft 41. Shield 48 is disposed adjacent slip ring bearing assembly 32. Insulator 20, such as a fiberglass tube, is disposed between rotatable portion 34 and slip ring bearing assembly 32. Slip ring bearing assembly 32 provides rotational electrical connection to rotatable portion 34. A vane segment 49 is disposed along the length of electrical conductor 14 to induce rotation within the airstream.

Figure 11:
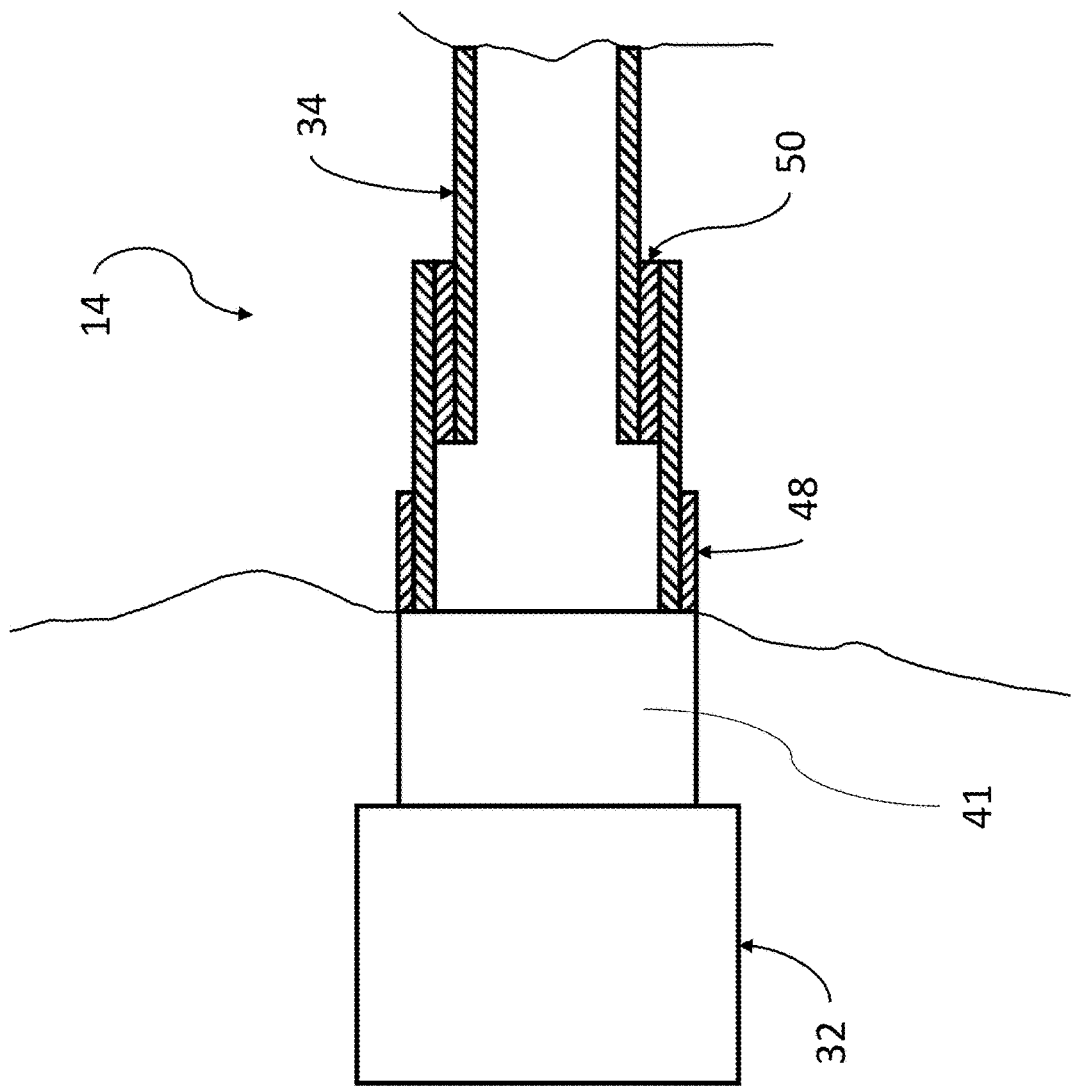
FIG. 11 shows a partial cross-sectional view of a construction of a first conductor in accordance with an embodiment of the ionic propulsion system of the present invention.

As shown in FIG. 11, a construction of first conductor 14 having rotatable portion 34 is illustrated. Shaft 41 is coupled to slip ring bearing assembly 32. Slip ring bearing assembly 32 is coupled to carriage element 22 (not shown). By way of illustration and not by limitation, shaft 41 is made from an insulated tube, such as a fiberglass or nylon tube. Rotatable portion 34 of first conductor 14 may be secured to shaft 41 by an epoxy 50 or other known techniques.

Figure 12:
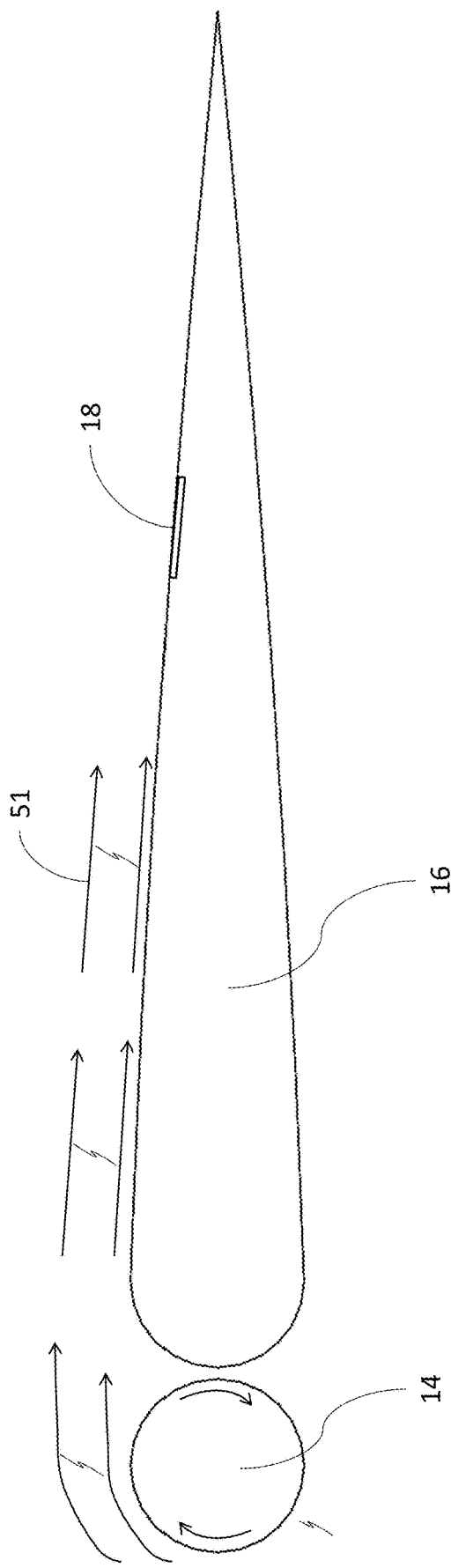
FIG. 12 shows an illustration of the airflow with respect to an embodiment of the ionic propulsion system of the present invention.

As shown in FIG. 12, rotatable portion 34 of first conductor 14 rotates in the airstream to advantage the Magnus effect. The energized ion particles flow 51 toward and are attracted to second conductor 18. This flow 51 is assisted by the electrical charge and by the Magnus effect.

Figure 13:
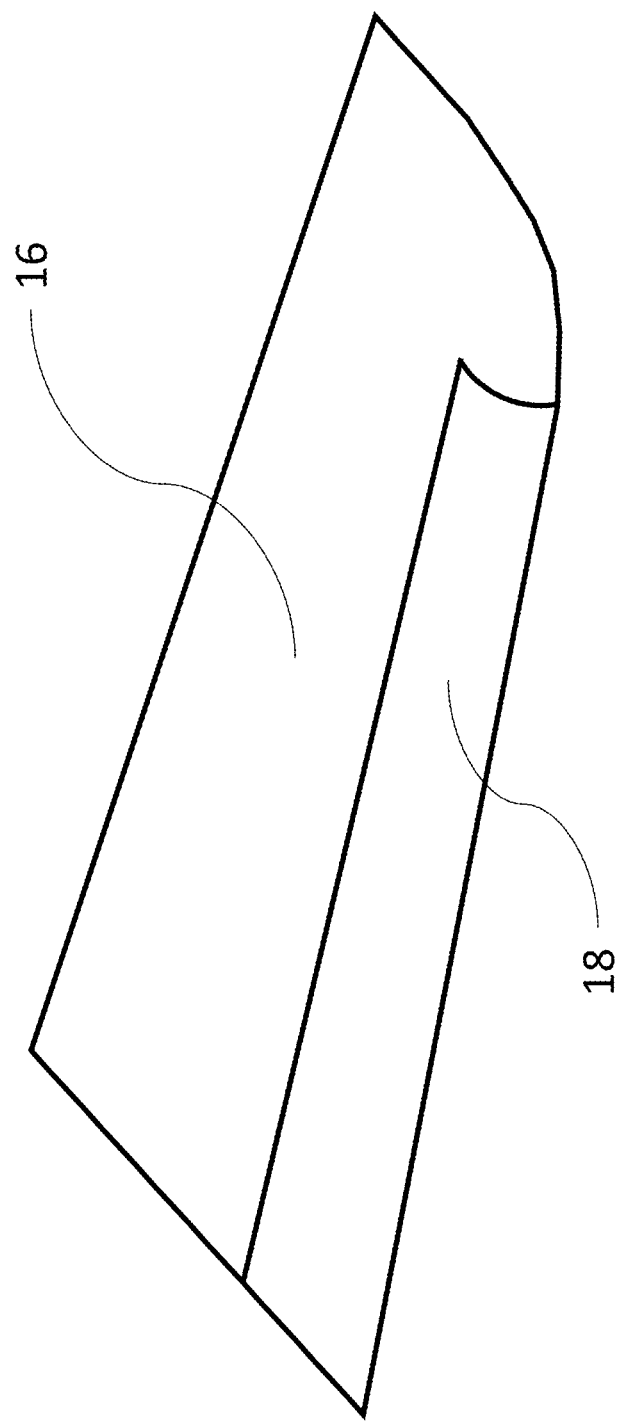
FIG. 13 shows a perspective view of another embodiment of the ionic propulsion system of the present invention.

As shown in FIG. 13, second conductor 18 may be shaped such that it is integral with the leading surface of second airfoil 16.

Figure 14:
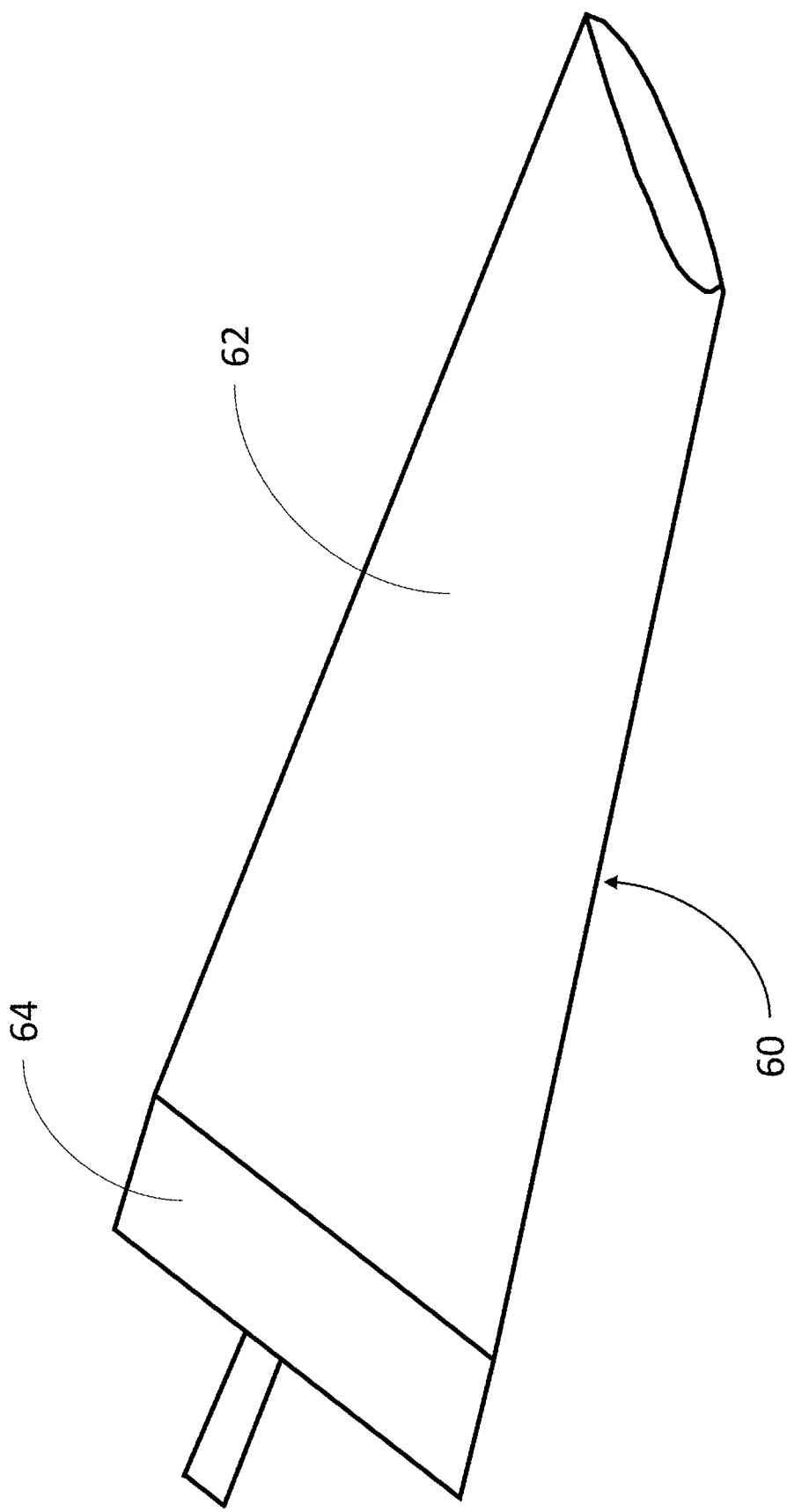
FIG. 14 shows a perspective view of a conductor in accordance with another embodiment of the ionic propulsion system of the present invention.

As shown in FIG. 14, another embodiment of a second conductor 60 is generally illustrated. Second conductor 60 includes a conducting portion 62 and an insulated portion 64 for attachment to carriage element 22 (not shown).

Figure 15:
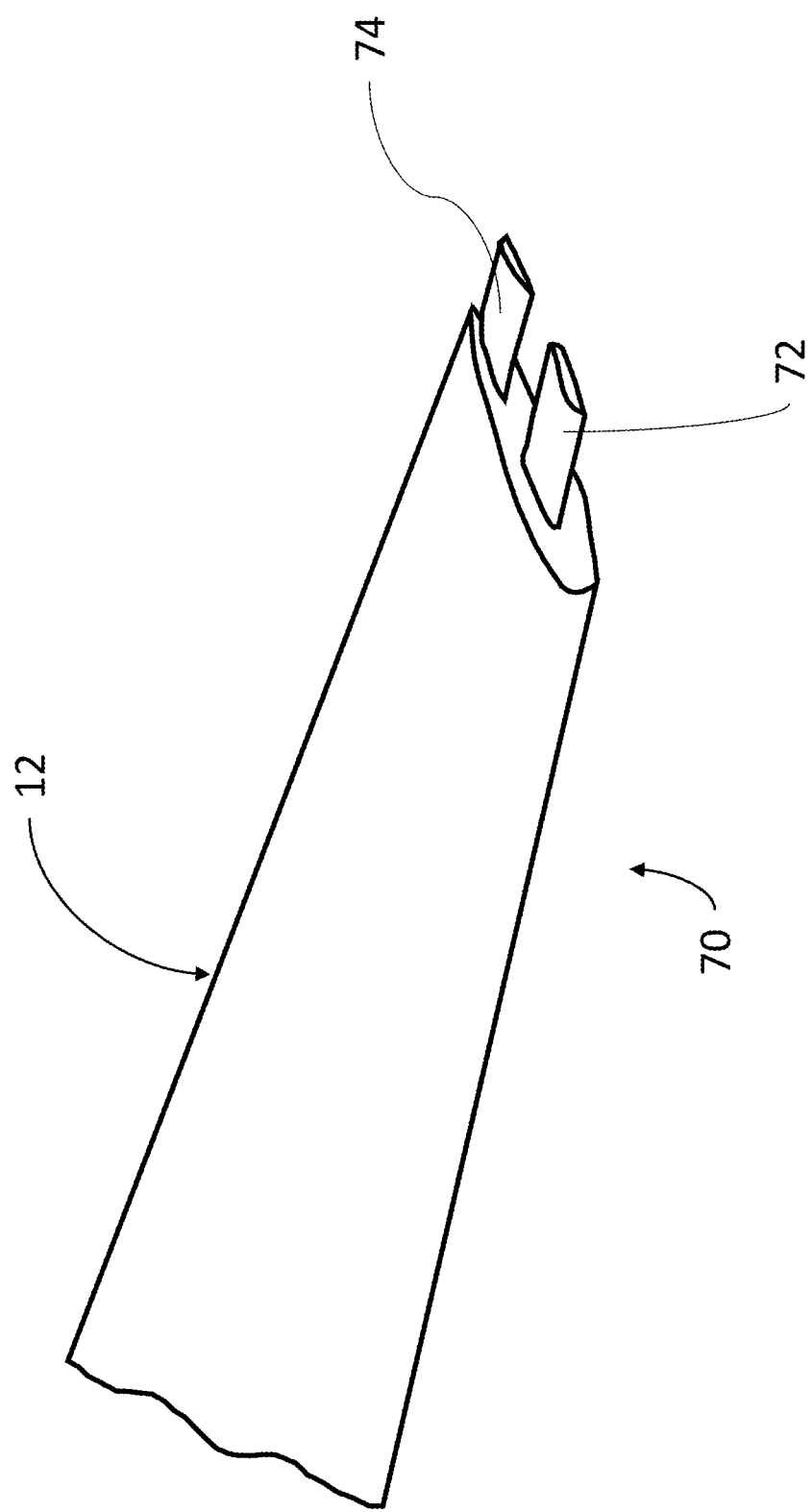
FIG. 15 shows a perspective view of another embodiment of the ionic propulsion system of the present invention.

In FIG. 15, another embodiment of an ionic propulsion system 70 is shown in an extended position from airfoil 12. Ionic propulsion system 70 has a first conductor 72 forming an airfoil and a second conductor 74 forming an airfoil.

Figure 16:
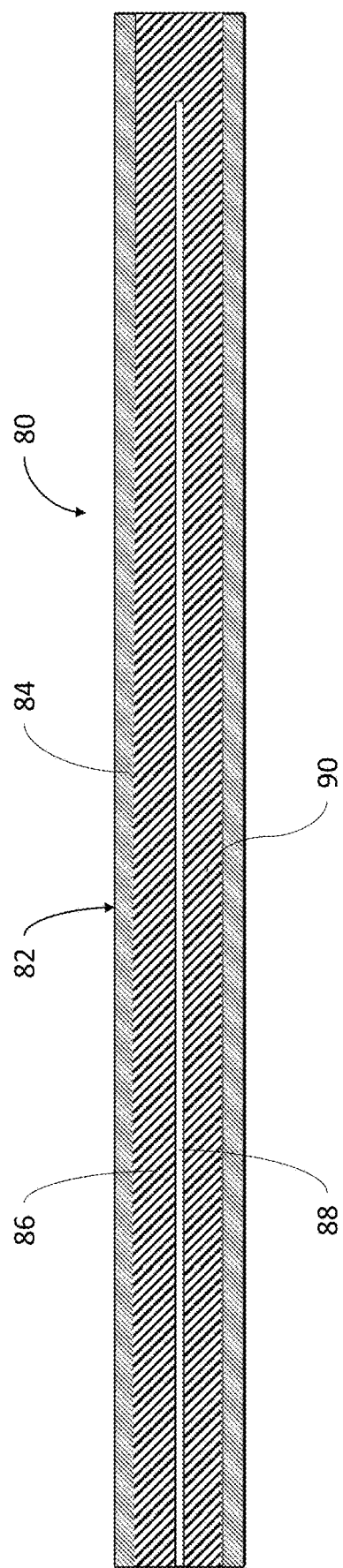
FIG. 16 shows a cross-sectional view of another embodiment of a conductor for use with the ionic propulsion system of the present invention.

As shown in FIG. 16, another embodiment of a conductor 80 for use with ionic propulsion system 10 is shown. Conductor 80 comprises an environmental coating 82 disposed on a tubular conductor 84 having an insulated core 86. An electrical connector 88 is centrally disposed and is coupled to the tubular conductor by a plurality of wires 90.

In use in an aircraft, ionic propulsion system 10 may be positioned in its retracted position within airfoil 12 during heavy lift operations, such as in takeoff and landing, when flaps and/or slats are deployed. As the aircraft ascends toward and above the upper atmosphere, particularly where the aircraft approaches its aerodynamic ceiling or Q corner, i.e., where the aircraft's stall speed is approaching its critical Mach number, ionic propulsion system 10 is used to improve boundary adherence, particularly at the wing tips of a swept wing jet and/or in the winglet of a swept wing jet.

The aircrew deploys ionic propulsion system 10 via actuator 24 which moves carriage element 22 toward airfoil end 26 to extend first conductor or electrode 14 and second airfoil 16 containing second conductor or electrode 18 from end 26 of airfoil 12. After movement to the second position, ionic propulsion system 10 is energized via power supply 46. A Dielectric Barrier Discharge (DBD) plasma actuator (power supply 24) creates a localized filament AC waveform (AC-DBD). The discharge is driven by repetitive nanosecond duration pulses (NS-DBD). DBD plasma is created using these waveforms. First conductor 14 acts as a positively charged electrode, charging the ion particles in the vicinity of the first conductor or electrode 14. Second conductor or electrode 18 is negatively charged. The ion particles in the vicinity of first conductor or electrode 14 are thus positively charged and attracted to the negatively charged second conductor or electrode 18. Surface adhesion, i.e., boundary separation in the vicinity of end 26 of airfoil 12 is thereby benefited. Power supply 24 may include local batteries to provide the electrical current efficiently for the generation of the repetitive high voltage nanosecond pulses.

According to an embodiment of the invention, first conductor 14 is rotationally mounted via slip ring bearing assembly 32. As the airstream strikes vanes 49, rotation is imparted to rotatable portion 34. Air particles are influenced by the Magnus effect of the rotation of the cylinder (rotatable 34) and by ionic charging, and flow to second conductor or electrode 18 via the slip stream and electric charge. Ionic particles under the area of influence accelerate faster along second airfoil 16 improving boundary adherence to delay separation at the airfoil end 26 adjacent ionic propulsion system 10.

As will be appreciated by those skilled in the art, flight control may be achieved by embodiments of the invention by differential use of the ionic propulsion system on a moving craft, such as an aircraft, spacecraft, and other vehicle on which it is deployed.

While the invention is provided in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that the exemplary embodiments may include only some of the described exemplary aspects. Accordingly, the invention it not to be seen as limited by the foregoing description but is only limited by the scope of the appended claims.

The invention claimed is:

1. An ionic propulsion system for an aircraft having an airfoil, the airfoil having a leading edge, a trailing edge and an end extending between the leading edge and trailing edge, the aircraft having at least one of flaps or slats, the system comprising:
a first conductor;
a second conductor;
said first conductor and said second conductor being disposed substantially within the airfoil when not in use;
an actuator for extending and retracting said first conductor and said second conductor from the end of the airfoil such that said first conductor and said second conductor are in the airstream of the aircraft, said first conductor being upstream of said second conductor in the airstream, wherein said actuator is configured to extend said first conductor and said second conductor when the aircrafts speed is approaching or within Mach range, and wherein said actuator is configured to retract said first conductor and second conductor when the at least one of the flaps or slats are deployed; and
a power supply for supplying current to said first conductor and said second conductor to ionize the air particles in a vicinity of said first conductor and said end of the airfoil to create a flow of the ionized particles from said first conductor toward said second conductor.

2. The ionic propulsion system in accordance with claim 1, wherein said second conductor is carried by a second airfoil, said second airfoil being substantially disposed within the airfoil when not in use, said second airfoil being extended by said actuator for use to extend from said end of the airfoil.

3. The ionic propulsion system in accordance with claim 1, wherein said first conductor comprises a rotatable portion.

4. The ionic propulsion system in accordance with claim 3, wherein said rotatable portion is connected to said power supply by a rotatable electrical connector.

5. The ionic propulsion system in accordance with claim 4, wherein said rotatable electrical connector is a slip ring.

6. The ionic propulsion system in accordance with claim 1, wherein said power supply comprises a dielectric barrier discharge plasma actuator.

\* \* \* \* \*